United States Patent
Schüler et al.

(10) Patent No.: US 6,234,575 B1
(45) Date of Patent: May 22, 2001

(54) LONGITUDINAL ADJUSTMENT DEVICE IN A VEHICLE SEAT, ESPECIALLY FOR TWO-DOOR MOTOR VEHICLES

(75) Inventors: Rolf Schüler, Heiligenhaus; Joachim Flick, Hückeswagen; Ronald Rischewski, Löffingen; Ralph Eble, Unterkirnach, all of (DE)

(73) Assignee: Keiper GmbH & Co., Kaiserslautern (DE)

( * ) Notice: Subject to any disclaimer, the term of this patent is extended or adjusted under 35 U.S.C. 154(b) by 0 days.

(21) Appl. No.: 09/367,468
(22) PCT Filed: Oct. 29, 1998
(86) PCT No.: PCT/EP98/06872
  § 371 Date: Aug. 13, 1999
  § 102(e) Date: Aug. 13, 1999
(87) PCT Pub. No.: WO99/32324
  PCT Pub. Date: Jul. 1, 1999

(30) Foreign Application Priority Data

Dec. 20, 1997 (DE) .............................................. 197 57 110

(51) Int. Cl.[7] .................................................... A47C 1/024
(52) U.S. Cl. ........................ 297/344.1; 248/429; 248/430
(58) Field of Search ................................. 297/341, 344.1; 248/429, 430

(56) References Cited

U.S. PATENT DOCUMENTS

| 5,407,165 | * | 4/1995 | Balocke | 297/344.1 X |
| 5,820,216 | * | 10/1998 | Feuillet | 297/344.1 X |
| 5,829,728 | * | 11/1998 | Hoshihara et al. | 297/344.1 X |
| 5,893,610 | * | 4/1999 | Schuler et al. | 297/344.1 X |
| 5,918,847 | * | 7/1999 | Couasnon | 297/344.1 X |
| 6,036,157 | * | 3/2000 | Baroin et al. | 297/344.1 X |
| 6,098,946 | * | 8/2000 | Sechet et al. | 298/344.1 X |

FOREIGN PATENT DOCUMENTS

| 196 13 432 C1 | 7/1997 | (DE) . |
| 0844132 | 5/1998 | (EP) . |
| 0844133 | 5/1998 | (EP) . |

* cited by examiner

Primary Examiner—Peter M. Cuomo
Assistant Examiner—Stephen Vu
(74) Attorney, Agent, or Firm—Friedrich Kueffner

(57) ABSTRACT

A longitudinal adjusting device on a motor vehicle seat having a seat back adjustable relative to the seat part and forwardly foldable after releasing an arresting device, has movable rails on which the seat is fastened. The moveable rails can slide in guide rails attached to the vehicle. One movable rail has a locking device that releasably locks the moveable rail on the guide rail. The locking device has a positioning device for returning the seat to its previous longitudinal position. The positioning device has a positioning disc with locking teeth and an arresting lever with a toothed segment engaging the locking teeth. The arresting lever can be released from the locking teeth to allow rotation of the positioning disc during longitudinal adjustment of the seat. A spring-loaded winding drum is arranged coaxially to the positioning disc and allows the seat part to slide forward by a tension member attached to the seat part or the guide rail.

9 Claims, 4 Drawing Sheets

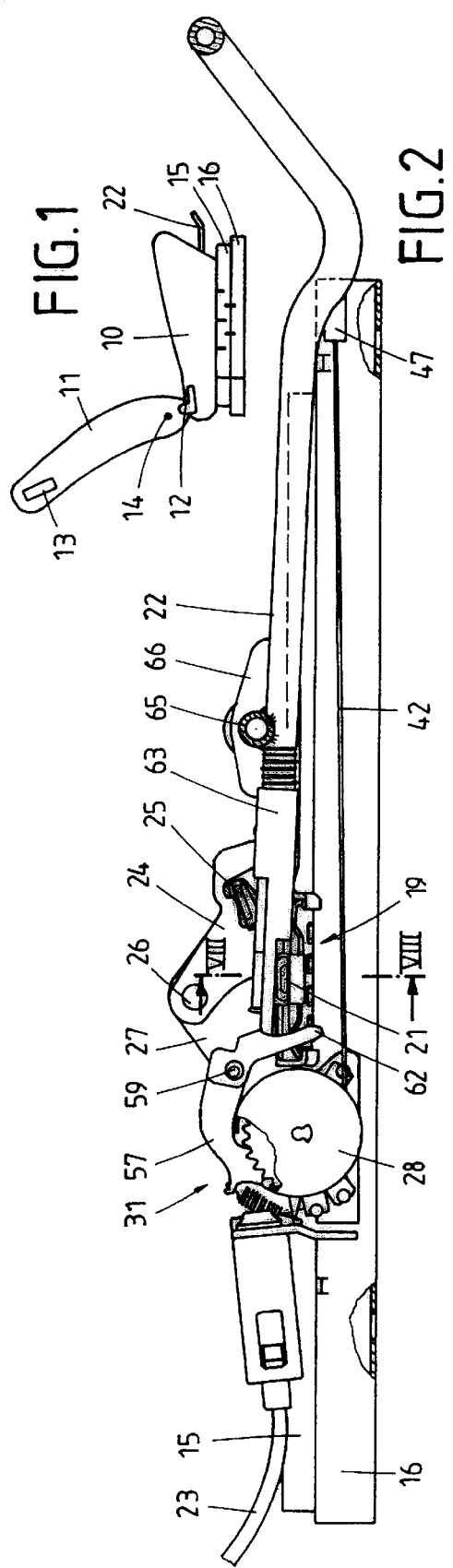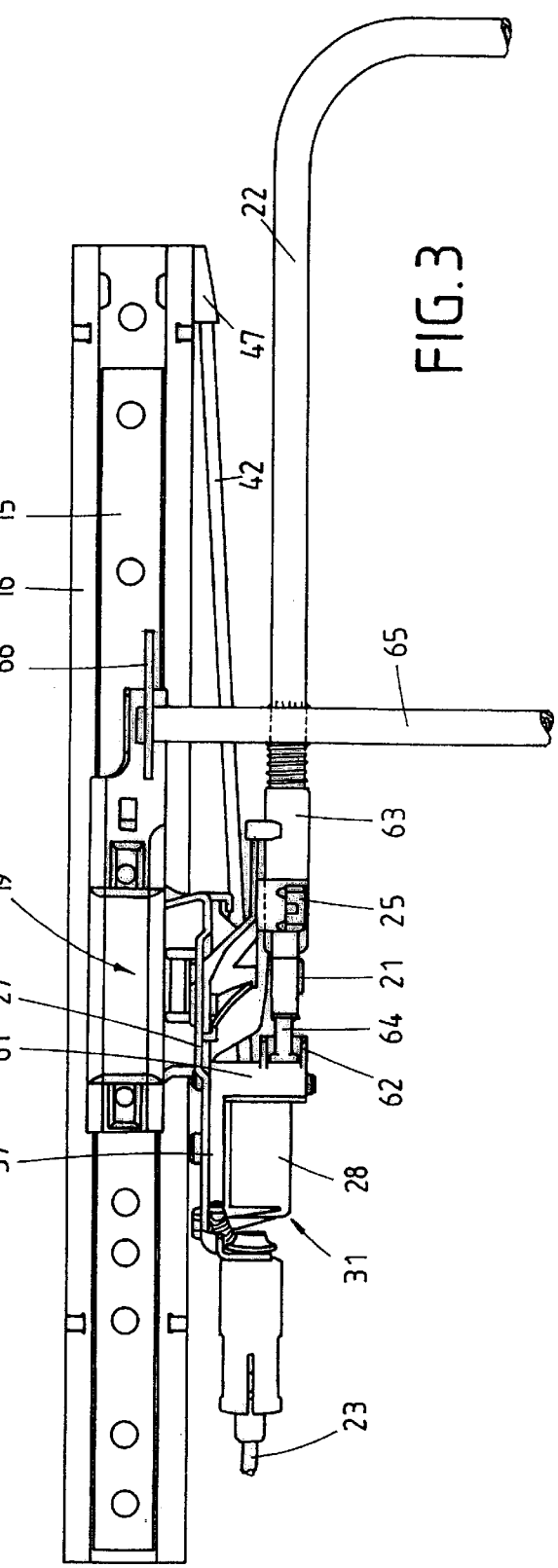

LONGITUDINAL ADJUSTMENT DEVICE IN A VEHICLE SEAT, ESPECIALLY FOR TWO-DOOR MOTOR VEHICLES

BACKGROUND OF THE INVENTION

1. Field of the Invention

The invention pertains to a longitudinal adjusting device for the seat of a motor vehicle, especially two-door motor vehicles, the back of which seat can be tilted adjustably with respect to the seat part by means of adjusting hardware, and which, after the release of an arresting device, can be flipped forward, where the seat part is attached to movable rails which can slide along guide rails permanently attached to the vehicle, and where at least one movable rail has a locking device which can be disengaged from the guide rail, to which locking device a positioning device is assigned, which makes it possible for the seat to be returned to the original longitudinal position selected for it, which positioning device comprises a positioning disk with a set of external teeth, into which the toothed segment of an arresting lever engages, which lever is supported in a fixed position with respect to the movable rail but which can be moved out of the way if needed, where, coaxial to the positioning disk, a spring-loaded winding drum is mounted, by means of which the seat part can be shifted forward by the intermediate action of a tension member permanently attached to the vehicle floor or to the guide rail, the winding drum being provided with a stop for limiting the extent to which it can be rotated in the reverse direction by a counterstop on the positioning disk.

2. Description of the Related Art

A longitudinal adjusting device of the type described above can be derived from DE 196-47,447, in which the locking device can be released in two different ways so that the seat can be shifted longitudinally. First, by lifting a release handle in the forward area under the seat, the locking device attached to the movable rail can be released via a transverse lever from the position in which it is connected to the guide rail; that is, the locking catches of the locking device are lifted out of the row of teeth on the guide rail against the force of self-restoring springs. As this occurs, the end part of the release handle carries a connecting lever along with it in the release direction; this connecting lever lifts the toothed segment of an arresting lever out of the external teeth of a positioning disk. In this case, the previously selected terminal stop position used as a guide for returning the seat to the originally selected position is lost. So that the vehicle seat can be shifted without losing the position of the terminal stop, the connecting lever is detached from the release lever by way of an unlocking lever supported on the movable rail, so that the arresting lever remains undisturbed; as a result, the locking position of the positioning disk is pre-served. Nevertheless, the unlocking lever simultaneously presses the release handle against the transverse lever, so that this lever lifts the locking catches of the locking device out of the row of teeth on the guide rail. Thus, the previously selected stop position remains pre-served in the memory module, while the seat part along with the forward-tipped back can be slid forward and back again to the previously selected stop. To assist the forward sliding movement of the seat, a previously mentioned winding drum is provided, which is spring-loaded in the direction of the forward sliding movement. This drum is connected by way of a tension member either to the floor of the vehicle in the forward area of the rail arrangement or to the forward end of the guide rail. The position of the stop used as a guide for returning the seat to its originally selected longitudinal position can be adjusted when the seat is slid backwards by allowing the rotation of the winding drum, which carries another stop, to move the stop of the positioning disk along until, upon completion of the rearward sliding movement of the seat, the locking device holds the movable rail in a fixed position on the guide rail. At this point, the pivoting of the release handle back to its original position also causes the positioning disk to be held by the arresting lever, so that the position which the stop on the positioning disk reached at that time is fixed. So that the winding drum can now be allowed to make several revolutions without the need to release the positioning disk, two check rings are inserted between the stop on the positioning disk and the stop on the winding drum; these rings in turn have their own stops, which can be carried along in succession by the winding drum. Thus, while the seat is being slid backwards, the stops on the check rings move the stop on the winding drum into a stop position with respect to the stop of the positioning disk, while the stop position of the positioning disk is being maintained. To ensure that the check rings function properly, they must be installed in the correct order one behind the other; otherwise, it is impossible for the originally selected position of the seat to be restored. In addition, if it desired to allow the seat to slide a long distance, the number of check rings arranged in a row must be increased. This requires a large amount of space in the width direction, and it also increases the cost.

SUMMARY OF THE INVENTION

The task of the invention is to improve a longitudinal adjusting device of the general type described above in such a way that, first, the above-cited disadvantages can be avoided, and, second, that the number of components, especially of the memory module, can be reduced. This task is accomplished by a link block, which is guided in a spiral connecting link and which makes it possible for the winding drum to rotate, being provided between the stop of the winding drum and the counter stop of the positioning disk. As a result, check rings, such as those used in the solution according to the state of the art described above, can be completely eliminated in the solution according to the invention. Another advantage is that, depending on the design of the spiral connecting link and the link block, it is possible, if needed, for the winding drum to execute more than the approximately two revolutions which can be achieved with the check rings known according to the state of the art, which means that the movable rails can be slid much farther along the guide rails.

A practical embodiment of the spiral connecting link and the link block can be achieved by designing the link block preferably as a ring segment, which has a guide rib which engages with the spiral connecting link. The connecting link takes the form of a groove recessed into the sidewall of the positioning disk. The spiral connecting link in this case is preferably designed so that it begins a short radial distance from the hub of the positioning disk and ends at the counterstop on the positioning disk, located radially just below the locking teeth; the pitch of the spiral connecting link is such that the radially outward directed component of the link block's motion can carry it underneath and past the counterstop of the positioning disk before the block makes its last revolution.

The link block can be given precise radial guidance as the positioning disk rotates by providing guide fingers on the link block, one projecting from each of the two end surfaces of the block, both pointing at the hub of the positioning disk.

These guide fingers are arranged with respect to each other like a fork and project across the hub at a tangent to its outer circumference. It is obvious that the guide fingers must be long enough to remain in contact with the outside surface of the hub of the positioning disk even after the greatest possible radial distance between the link block and the hub of the positioning disk has been reached.

As previously mentioned, the counterstop is assigned to the positioning disk, whereas the stop is assigned to the winding drum. The stop on the winding drum can preferably be formed by the outsidewalls of an insertion pocket for a lead retainer seal of the tension member.

So that the winding drum can be rotated freely with respect to the positioning disk, the counterstop of the positioning disk projects axially only so far from its sidewall that the ribs and insertion pocket of the winding drum can be rotated freely past the counterstop. The axial length of the link block, furthermore, is greater than the axial length of the counterstop, because, when the link block is resting against the counterstop of the positioning disk, it must also form an abutment for the stop of the winding drum.

BRIEF DESCRIPTION OF THE DRAWING

The invention is shown in the drawing on the basis of an exemplary embodiment and is explained in greater detail below:

FIG. 1 shows a schematic diagram of a vehicle seat, seen from the side;

FIG. 2 shows a pair of rails of a vehicle seat arranged along one of the long sides of a seat provided with the longitudinal adjusting device, in a side view looking from inside the seat;

FIG. 3 shows a plan view of the pair of rails seen in FIG. 1 with the longitudinal seat adjusting device;

FIG. 4c shows how the locking device and the positioning device are released by the pivoting of the release handle;

FIG. 5 shows the positioning device in a longitudinal cross section along line V—V of FIG. 4a;

DESCRIPTION OF THE PREFERRED EMBODIMENT

Figure 8:
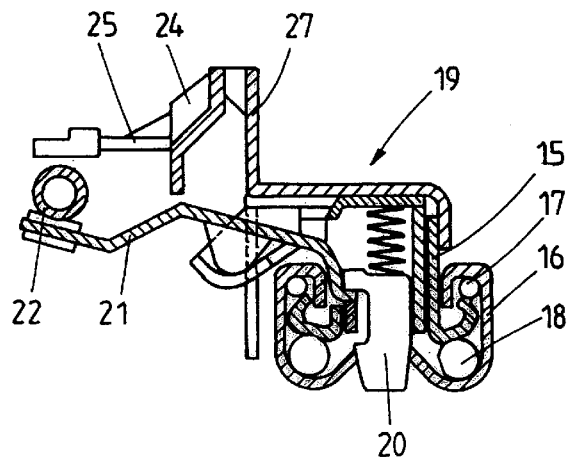
FIG. 8 shows the locking device and the pair of rails in a cross section along line VIII—VIII of FIG. 2.
Figure 9:
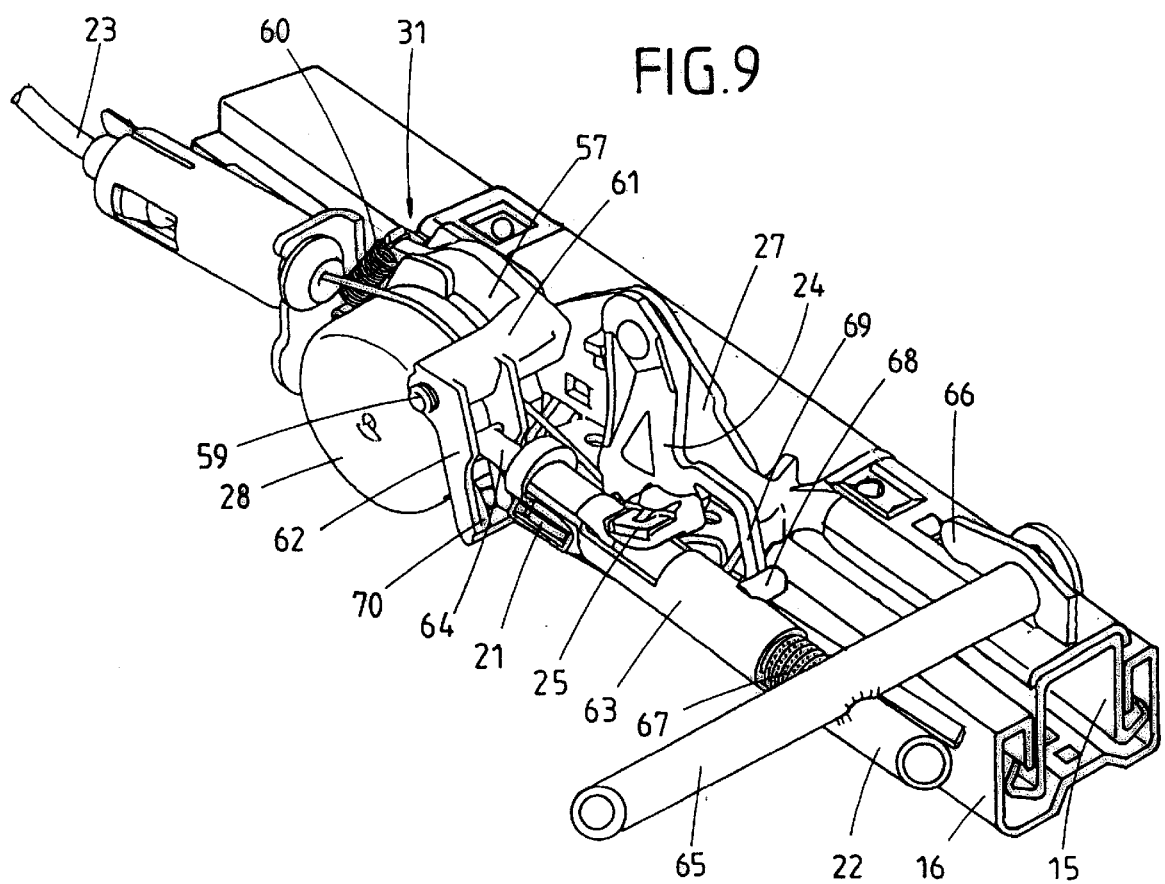
FIG. 9 shows the longitudinal adjusting device comprising a positioning device together with a pair of rails in a perspective view looking toward the inside of the pair of rails.

The vehicle seat shown schematically in FIG. 1 consists of a seat part 10 and a seat back 11, which is attached to the seat part by a hinge mechanism (not shown), which allows the angle of the back to be adjusted. The back can also be flipped forward with respect to seat part 10 around a pivot point 14 by pulling on a handle 13 connected to an arresting device 12. Each of the two longitudinal sides of seat part 10 are connected along the bottom to a movable rail 15, which engages in a guide rail 16, both guide rails being attached permanently to the floor of the vehicle. Movable rail 15, as can be seen especially in FIG. 8, is supported on guide rail 16 by rolling elements 17, 18 to allow freedom of longitudinal movement. On its incurved bottom, guide rail 16 has a longitudinal row of openings (not labeled separately), spaced a certain distance apart, which form a row of teeth. Into these openings, at least one of several locking catches 20 engages, these catches being components of a locking device 19, mounted in a fixed position on movable rail 15. The catches can be disengaged against the action of springs by a transverse lever 21, also mounted on movable rail 15; to accomplish this, a release handle 22, also in a fixed position on movable rail 15, is actuated. Locking device 19 of the longitudinal seat adjusting device, however, can also be released by handle 13 on seat back 11 together with arresting device 12 of the seat back, in that an unlocking lever 24 is actuated by way of a Bowden cable 23. This unlocking lever acts by way of an angled section 25 on release handle 22 in the unlocking direction and thus also actuates transverse lever 21 in such a way as to disengage locking catches 20 from the row of teeth in guide rail 16. The unlocking lever is supported by a pivot 26 on a mounting plate 27, which is attached in turn to movable rail 15. A housing 28, consisting of a lower housing part 29 and an upper housing part 30, which holds positioning device 31 and its winding drum 32, designed as a rotating element, is also attached to this mounting plate 27.

Figure 4A:
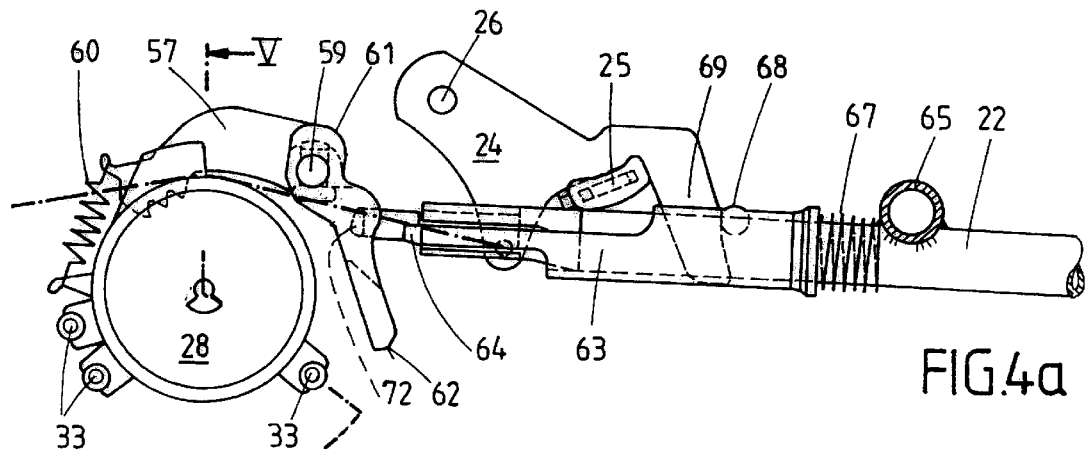
FIGS. 4a–4c show the rear area of the manually actuated release handle in three different positions. The position according to FIG. 4a shows the rest position; the position according to FIG. 4b shows how the locking device is released when the back of the seat is pivoted forward.
Figure 4B:
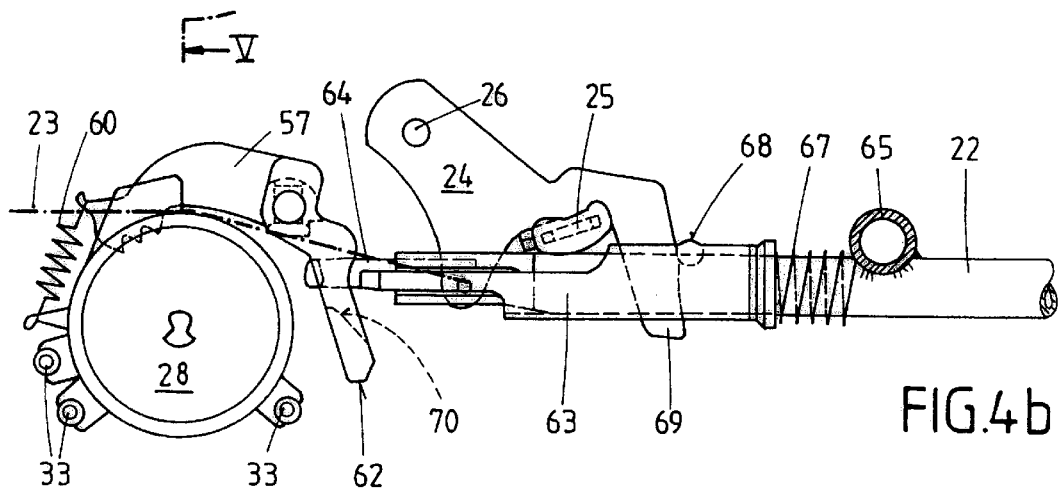
Figure 4C:
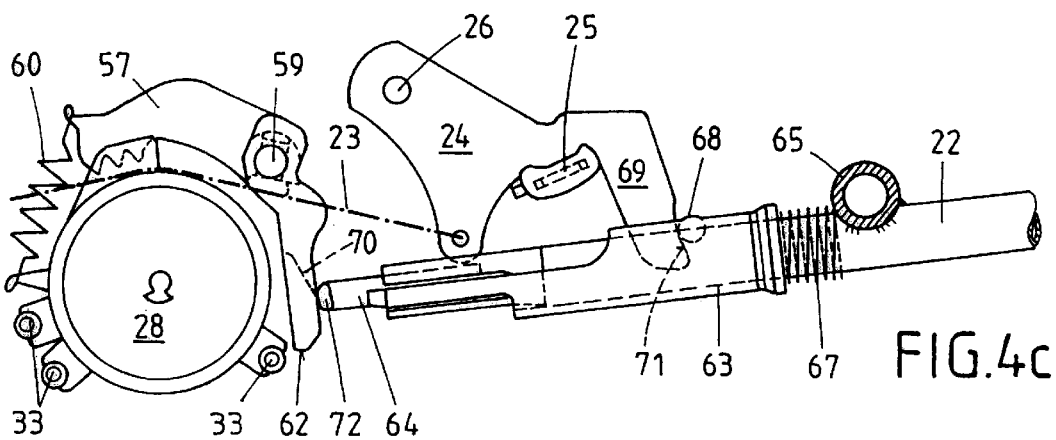
Figure 7:
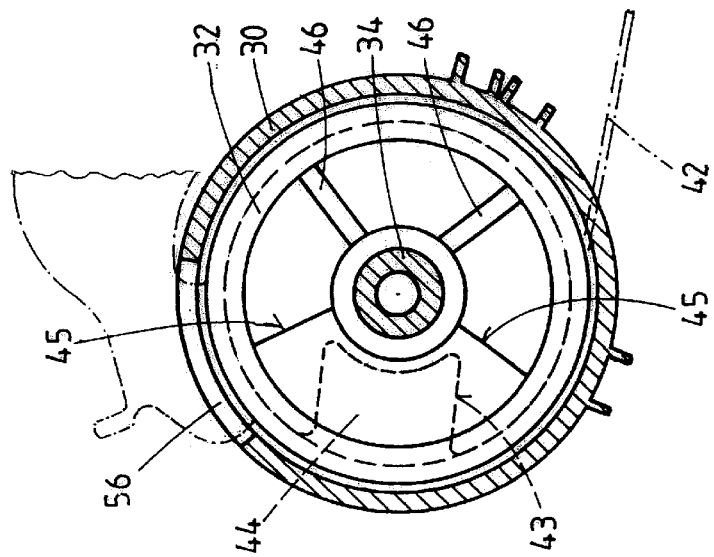
FIG. 7 shows the positioning device seen in FIG. 5 in a cross section along line VII—VII of FIG. 5.
Figure 5:
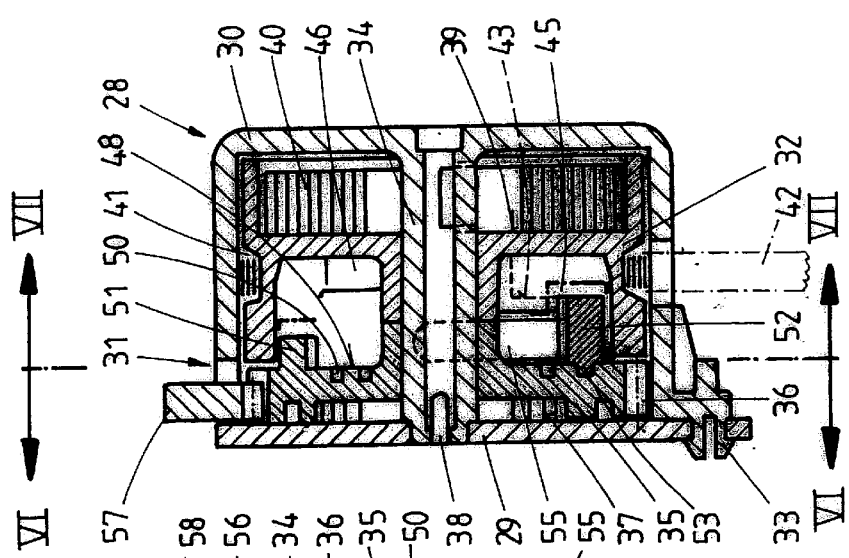

Can-shaped upper housing part 30, which can be seen in FIG. 5, is connected by way of clip projections 33 along the edges, which can also be seen in FIGS. 4a–4c, to disk-shaped lower housing part 29, this lower housing part 29 being permanently connected in a manner not shown to mounting plate 27 attached to movable rail 15. An inward-projecting axle 34 is provided in the center of cup-like upper housing part 30. A positioning disk 35 is supported with freedom of rotation on this axle 34; a set of locking teeth 36 extends around the entire outside circumference of the disk. On the side facing disk-shaped lower housing part 29, positioning disk 35 has a recess, in which a spiral spring 37, functioning as a torsion spring, is held. The inner, angled, end of this spring engages in a recess 38 in axle 34, whereas the outer end of the spring is held in a manner not shown in detail in the circumferential area of the recess in positioning disk 35.

Together with positioning disk 35, the previously mentioned winding drum 32 is also supported on axle 34 so that it can rotate independently of the positioning disk. On the side facing away from positioning disk 35, winding drum 32 has a recess 39, which also holds a spiral spring 40, which functions as a torsion spring. In a manner known in itself, the inner end of this spring is attached to axle 34, whereas the outer end is attached to the outside lateral surface of winding drum 32. The outside lateral surface of winding drum 32 has a section 41 of reduced diameter, which forms the holding space for a tension member 42, which is attached to the winding drum and which can be in the form of a belt, for example. Underneath reduced-diameter section 41, there is an insertion pocket 43, oriented toward the center of winding drum 32, in which a lead retainer seal 44, permanently attached to one end of tension member 42, fits. Each of the two outsidewalls of insertion pocket 43 extending in the axial direction forms a stop 45, the purpose of which will be described later. In addition to the walls of insertion pocket 43, which serve to increase the rigidity between the outside lateral surface and the hub of winding drum 32 and also form stops 45, ribs 46 are also provided between the hub and the outside lateral surface of winding drum 32. At the free end of tension member 42, a lock-in-position piece 47 is provided, by means of which tension member 42 is attached to guide rail 16, mounted in a fixed position on the floor.

A hub 49 projects from sidewall 48 of positioning disk 35; this hub points toward winding drum 32 and surrounds axle 34. A short radial distance away from this hub 49, a spiral connecting link 50 begins, and it ends at a counterstop 51, which projects from sidewall 48 of positioning disk 35 just below locking teeth 36. This counterstop 51 does not project far enough in the axial direction from sidewall 48 of positioning disk 35 to prevent either the radially oriented boundary walls of insertion pocket 43 or ribs 46 of winding drum 32 from rotating freely past counterstop 51. Spiral connecting link 50 is formed by a groove recessed into sidewall 48 of positioning disk 35. A guide rib 53 of a link block 52 engages in the groove which forms spiral connecting link 50. Link block 52, designed as a ring segment, forms an intermediate member between the associated stop 45 of winding drum 32 and counterstop 51 of positioning disk 35. The axial dimension of the link block is selected so that it can come to rest, first, against the associated stop 45 of the winding drum and, second, against counterstop 51 of positioning disk 35. To provide guidance, a guide finger 55 projects out from each end 54 of link block 52. These guide fingers 55 are arranged to form a fork, and even in the most extreme radial position, they remain tangent to hub 49 of positioning disk 35 on both sides.

Upper housing part 30 has on its circumferential area, adjacent to disk-shaped lower housing part 29, a cut-out section 56, through which toothed segment 58 of an arm of disengagable arresting lever 57 can pass, so that it can engage with locking teeth 36 of positioning disk 35. This arresting lever 57 is able to pivot around a pivot 59 on mounting plate 27, and its toothed segment is held in engagement with locking teeth 36 of positioning disk 35 by a locking spring 60, attached to an arm projecting from housing 28. Now, in the same way as previously described in accordance with the state of the art, it would be possible for a connecting lever to be connected to arresting lever 57, and this connecting lever could have a catch which would engage in a releasable manner in the tube at the end of the release handle. In the present embodiment, however, a downward-pointing fork lever 62 is nonrotatably attached to the same hub 61 as arresting lever 57, but offset in the axial direction. A plunger 64 of a sleeve 63 extends into the open space between the sidepieces of fork lever 62. The end of the plunger has a transverse head 72 projecting out toward both sides, and the sleeve is attached to the terminal area of release handle 22 in such a way that it is free to move in the longitudinal direction but is not free to rotate. The terminal area of release handle 22 begins behind transverse tube 65, which is permanently connected to release handle 22 by welding, for example. As a result of this tube, release handle 22 is pivotably supported in bearing brackets 66 permanently attached to the rails. One end of a compression spring 67, which surrounds release handle 22, is braced against transverse tube 65; the other end of the spring acts on sleeve 63. Sleeve 63, which contains axially guided plunger 64, has a laterally projecting pin 68, which, as a result of the action of compression spring 67, is held against an adjusting finger 69 of unlocking lever 24. The inside surfaces of the sidepieces of fork lever 62 have radial cam sidepieces 70, with which plunger 64 can come into contact when the rear part of release handle 22 is pivoted downward.

Figure 6:
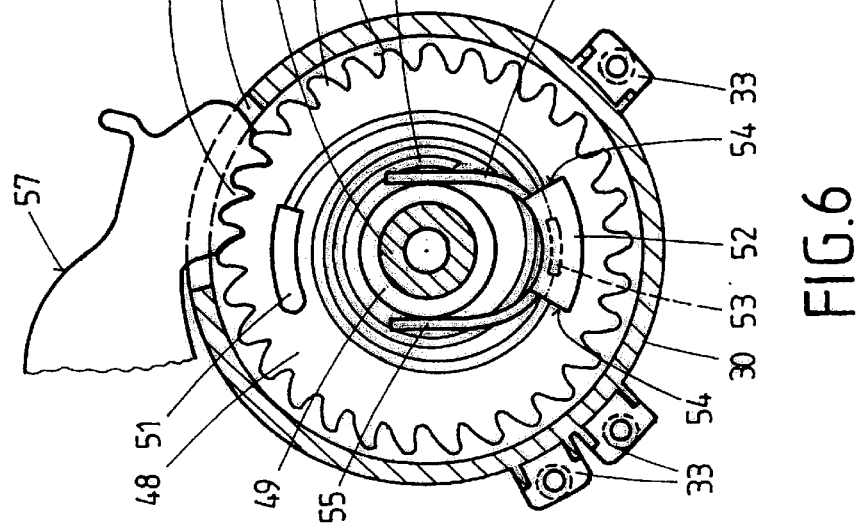
FIG. 6 shows the positioning device seen in FIG. 5 in a cross section along line VI—VI of FIG. 5.

While seat part 10 is being held in the desired position, release handle 22, unlocking lever 24, and arresting lever 57 with its fork lever 62 are in the position shown in FIG. 4a. When now the longitudinal position of the seat part of the seat is to be adjusted to a new position, handle lever 22 is pulled upward, so that its rear area pivots downward. During this pivoting movement, handle lever 22 presses transverse lever 21 (FIG. 8), so that the locking catches 20 of the locking device are lifted out of the row of teeth in guide rail 16; it thus becomes possible to slide movable rails 15, to which the seat is attached, in the one or the other longitudinal direction of the vehicle. Simultaneously, however, when the rear part of handle lever 22 pivots downward, transverse head 72 of plunger 64 in sleeve 63 arrives at radial cam surfaces 70 and thus presses fork lever 62 forward. This lever therefore pivots around pivot 59 in the clockwise direction, and as a result toothed segment 58 is lifted out of the locking teeth of positioning disk 35. This actuating position is shown in FIG. 4c. It must also be pointed out that, as a result of a circular path 71 on adjusting finger 69 of unlocking lever 24, which path curves around the center point of transverse tube 65, sleeve 63 and thus also its plunger 64 retain their positions with respect to the terminal area of release handle 22. This is so because no change has been made to the position of seat back 11, and therefore unlocking lever 24 has not been actuated; it thus remains in the position shown in FIGS. 4a and 4b. When now, in the actuating position shown in FIG. 4c, the seat is slid forward or back, tension member 42 is paid out or rolled up on winding drum 32. As a result, the cooperation of stop 45 on the drum, link block 52 resting against it, and counterstop 51 causes positioning disk 35 to rotate along with the drum, which it is free to do because arresting lever 57 has been swung out of position. As soon as the desired longitudinal position of the seat has been reached and release handle 22 has been let go, the handle swings back to its original position as shown in FIG. 4a under the force of the spring-loaded locking catches acting in the locking direction. At the same time, arresting lever 57 is swung back by locking spring 60 into its locking position as shown in FIGS. 4a and FIG. 6, where it holds positioning disk 35 in a fixed position.

When now seat back 11 is flipped forward and the seat is pushed forward out of this selected longitudinal seat position to allow more convenient access to the rear seat, the act of flipping back 11 forward has the effect of pulling on Bowden cable 23. As a result, unlocking lever 24 is pivoted in the clockwise direction around pivot 26, so that, on the one hand, bent section 25 of the lever presses the rear part of release handle 22 down. As this is happening, pin 68 on sleeve 63 follows adjusting finger 69 as the finger pivots forward in the clockwise direction under the force of compression spring 67, with the result that transverse head 72 of plunger 64, occupying the gap inside fork lever 62, arrives in the free space between fork lever 62 and housing 28, so that, when the rear part of release handle 22 is pushed down by bent section 25 for the purpose of pressing transverse lever 21 down, transverse head 72 of plunger 64 cannot come in contact with radial cams 70. Arresting lever 57 therefore remains in the position in which its toothed segment 58 is engaged with locking teeth 36 of positioning disk 35. The start of this actuating process is shown in FIG. 4b. When transverse lever 21 is pressed down, however, it is possible, as a result of the sliding of locking catches 20 out of the row of teeth of the guide rail, for the seat to be pushed forward. During this sliding movement of the seat, link block 52 can be moved away from counterstop 51 of positioning disk 35, because this stop, carried along in spiral connecting link 50 by stop 45, is able to yield. When now the vehicle seat, which has had its back flipped forward and been pushed forward, is returned to its original position, winding drum 32 rotates against the action of spiral spring 40, as a result of which link block 52 is carried along again by stop 45 until link block 52 comes to rest against the unchanged counterstop 51 of positioning disk 35. At this point the originally selected longitudinal position of the seat is reached again.

As previously mentioned, the embodiment of the object of the invention illustrated and described above presents only an example, to which the invention is in no way limited. On the contrary, additional designs and embodiments of the object of the invention are also possible. All of the features shown in the drawing and mentioned in the description, furthermore, are essential to the invention, even if they are not explicitly stated in the claims.

LIST OF REFERENCE NUMBERS

| | | | |
|---|---|---|---|
| 10 | seat part | 35 | positioning disk |
| 11 | seat back | 36 | locking teeth |
| 12 | arresting device | 37 | spiral spring |
| 13 | handle | 38 | recess |
| 14 | pivot point | 39 | cutout |
| 15 | movable rail | 40 | spiral spring |
| 16 | guide rail | 41 | area of reduced diameter |
| 17 | rolling element | 42 | tension member |
| 18 | rolling element | 43 | insertion pocket |
| 19 | locking device | 44 | lead retainer |
| 20 | locking catch | 45 | stop |
| 21 | transverse lever | 46 | rib |
| 22 | release handle | 47 | lock-in-position |
| 23 | Bowden cable | 48 | sidewall |
| 24 | unlocking lever | 49 | hub of 35 |
| 25 | bent section | 50 | spiral connecting link |
| 26 | pivot | 51 | counterstop |
| 27 | mounting plate | 52 | link block |
| 28 | housing | 53 | guide rib |
| 29 | lower housing part | 54 | end surface of 52 |
| 30 | upper housing part | 55 | guide finger |
| 31 | positioning device | 56 | cut-out section |
| 32 | winding drum | 57 | arresting lever |
| 33 | clip projection | 58 | toothed segment |
| 34 | axle | 59 | pivot |
| | | 60 | locking spring |
| | | 61 | hub of 57 and 62 |
| | | 62 | fork lever |
| | | 63 | sleeve |
| | | 64 | plunger |
| | | 65 | transverse tube |
| | | 66 | bearing bracket |
| | | 67 | compression spring |
| | | 68 | pin on 63 |
| | | 69 | adjusting finger |
| | | 70 | radial cam surface |
| | | 71 | circular path |
| | | 72 | transverse head on 64 |

What is claimed is:

1. A longitudinal adjusting device on a motor vehicle seat having a seat part and a seat back, wherein the seat back is connected by adjusting hardware to the seat part and is configured to be tilted adjustably with respect to the seat part and to be flipped forward after releasing an arresting device, wherein the longitudinal adjusting device comprises:

movable rails on which the seat part is fastened, the moveable rails configured to slide in guide rails permanently attached to the vehicle, wherein at least one of the movable rails has a locking device configured to releasably lock the moveable rail on the guide rail;

the locking device having a positioning device configured to allow a return of the seat to a previously selected longitudinal position;

the positioning device comprising a positioning disc with a set of locking teeth and an arresting lever having a toothed segment engaging the locking teeth in a selected position of the seat, wherein the arresting lever is fixedly positioned relative to the movable rail and is configured to be disengaged from the locking teeth to allow rotation of the positioning disc during longitudinal adjustment of the seat;

a spring-loaded winding drum positioned coaxially to the positioning disc and configured to allow the seat part to slide forward by intermediate action of a tension member attached to the seat part or to the guide rail;

the winding drum having a stop and the positioning disc having a counter stop, wherein the stop is configured to limit a reverse rotation of the winding drum caused by the counter stop of the positioning disc;

the positioning device comprising a spiral connecting link; and a link block guided in the spiral connecting link and being located between the stop of the winding drum and the counter stop of the positioning disc;

the link block being configured to allow rotation of the winding drum.

2. The longitudinal adjusting device according to claim 1, wherein the spiral connecting link is arranged in a sidewall of the positioning disc facing the winding drum and is configured to allow several revolutions of the winding drum relative to the position disc.

3. The longitudinal adjusting device according to claim 2, wherein the link block is a ring segment with a guide rib engaging the spiral connecting link, wherein the spiral connecting link is a groove recessed into the sidewall of the positioning disc.

4. The longitudinal adjusting device according to claim 3, wherein the spiral connecting link has a first end located at a short radial distance from a hub of the positioning disc and has a second end at the counter stop, wherein the counter stop is located radially proximal to the locking teeth of the positioning disc, wherein the spiral connecting link has a pitch such that the link block passes underneath the counter stop before carrying out a last revolution when moving with a radially outwardly directed movement component.

5. The longitudinal adjusting device according to claim 4, wherein the pitch of the spiral connecting link varies, wherein the pitch at the counter stop is configured to allow the link block to pass under the counter stop after completion of one revolution, wherein the pitch is reduced thereafter to provide a spiral connecting link with as many turns as possible and to arrange the turns of the spiral connecting link closely together in a radial direction of the positioning disc.

6. The longitudinal adjusting device according to claim 4, wherein the link block has ends each provided with a guide finger projecting away from the ends and pointing toward the hub of the positioning disc, wherein the guide fingers form a fork and extend tangentially across an outside circumference of the hub.

7. The longitudinal adjusting device according to claim 1, wherein the winding drum has an insertion pocket configured to receive a lead retainer for the tension member, wherein the stop of the winding drum is formed by axial outside walls of the insertion pocket.

8. The longitudinal adjusting device according to claim 7, wherein the counter stop of the positioning disc projects only to such an extent from a sidewall of the positioning disc that ribs provided on the winding drum and the insertion pocket of the winding drum freely pass the counter stop when the winding drum rotates.

9. The longitudinal adjusting device according to claim 1, wherein the spiral connecting link is arranged in a wall of the winding drum facing the positioning disc and is configured to allow several revolutions of the winding drum relative to the position disc.

* * * * *